(12) United States Patent
Park et al.

(10) Patent No.: US 10,554,163 B2
(45) Date of Patent: Feb. 4, 2020

(54) APPARATUS FOR CONTROLLING POSITION OF VOICE COIL MOTOR USING VOLTAGE/FREQUENCY CONVERSION TECHNIQUES

(71) Applicant: Samsung Electro-Mechanics Co., Ltd., Suwon-si (KR)

(72) Inventors: Jung Eui Park, Suwon-si (KR); Woo Young Choi, Suwon-si (KR); Joo Hyoung Lee, Suwon-si (KR); Joo Yul Ko, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/144,070

(22) Filed: Sep. 27, 2018

(65) Prior Publication Data
US 2019/0131906 A1    May 2, 2019

(30) Foreign Application Priority Data

Nov. 1, 2017 (KR) .................. 10-2017-0144745
Apr. 4, 2018 (KR) .................. 10-2018-0039058

(51) Int. Cl.
*H02K 41/00* (2006.01)
*H02P 25/034* (2016.01)
*G02B 7/04* (2006.01)

(52) U.S. Cl.
CPC .............. *H02P 25/034* (2016.02); *G02B 7/04* (2013.01)

(58) Field of Classification Search
CPC .. H02P 25/034; H02P 6/16; H02P 6/28; H02P 7/025
See application file for complete search history.

(56) References Cited

U.S. PATENT DOCUMENTS

2019/0045095 A1*   2/2019   Tanimukai .......... H04N 5/23258

FOREIGN PATENT DOCUMENTS

| KR | 10-1166418 B1 | 7/2012 |
|---|---|---|
| KR | 10-2013-0077216 A | 7/2013 |
| KR | 10-2014-0088308 A | 7/2014 |

\* cited by examiner

*Primary Examiner* — Karen Masih
(74) *Attorney, Agent, or Firm* — NSIP Law

(57) ABSTRACT

An apparatus for controlling a position of a voice coil motor (VCM) includes a coil disposed to face a magnetic member provided on one surface of a lens carrier; a driving circuit applying a superimposed current, including a driving current and a position detecting current, to the coil; a filter circuit extracting an alternating current (AC) voltage from a voltage across the coil; a voltage/frequency conversion circuit converting the AC voltage extracted by the filter circuit into a frequency signal; and a digital control circuit detecting positional information of the VCM based on a frequency component of the frequency signal.

16 Claims, 6 Drawing Sheets

APPARATUS FOR CONTROLLING POSITION OF VOICE COIL MOTOR USING VOLTAGE/FREQUENCY CONVERSION TECHNIQUES

CROSS-REFERENCE TO RELATED APPLICATIONS

This application claims the benefit under 35 USC 119(a) of Korean Patent Application Nos. 10-2017-144745 filed on Nov. 1, 2017 and 10-2018-0039058 filed on Apr. 4, 2018 in the Korean Intellectual Property Office, the entire disclosure of which is incorporated herein by reference for all purposes.

BACKGROUND

1. Field

This application relates to an apparatus for controlling a position of a voice coil motor (VCM) using voltage/frequency conversion techniques.

2. Description of the Background

In the case of a camera module for a mobile phone, a slimness and high resolution images have recently been required. In order to satisfy such requirements, mounting of a lens having a high opening ratio in a camera, and functions such as autofocusing and optical image stabilization (OIS) are required. However, in order to perform the autofocusing and OIS, it is necessary to accurately detect a current position value and to determine accuracy of the position.

As a conventional technique, a method of performing a positional control using a hall sensor and a position sensing magnet may be used.

In the case of using a conventional hall sensor, a separate magnet may be required. In this case, a reference value of a position of the hall sensor may be changed depending on temperature or other external conditions. There may be a disadvantage, in that an additional circuit such as a low pass filter, an auto gain control amplifier (AMP), a differential to signal amplifier, or an analog-to-digital converter (ADC) is required to correct the change in the reference value.

In addition, in the case of using an external hall sensor, there is a disadvantage, in that a bias current (e.g., having a level of several mA) may be consumed to drive the hall sensor and a current may be additionally consumed by a variety of amplifiers (AMPs).

In order to solve problems of a mechanical design limitation, additional current consumption, and an increase in material costs of the camera module, a technique capable of more accurately detecting a position without using the hall sensor is required.

The above information is provided as background information only to assist with an understanding of the present disclosure. No determination has been made, and assertion is made, as to whether any of the above might be applicable as prior art with regard to the disclosure.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An apparatus for controlling a position of a voice coil motor (VCM) includes a coil disposed to face a magnetic member that is provided on one surface of a lens carrier; a driving circuit configured to apply a superimposed current, including a driving current and a position detecting current, to the coil; a filter circuit configured to extract an alternating current (AC) voltage from a voltage across the coil; a voltage/frequency conversion circuit configured to convert the AC voltage extracted by the filter circuit into a frequency signal; and a digital control circuit configured to detect positional information of the VCM based on a frequency component of the frequency signal.

The position detecting current may include a specific frequency component, and the specific frequency component may be used to measure a change in impedance of the coil.

The position detecting current may have one of a sinusoidal wave, a triangle wave, a sawtooth wave, and a square wave waveform.

The voltage/frequency conversion circuit may include a voltage controlled oscillator that is configured to generate the frequency signal, and the frequency signal may have a frequency based on a magnitude of the AC voltage extracted by the filter circuit.

The digital control circuit may be configured to perform one or both of position controlling of the VCM and position correction controlling of the VCM through the driving circuit, based on the positional information.

An apparatus for controlling a position of a voice coil motor (VCM) includes a coil disposed to face a magnetic member provided on one surface of a lens carrier; a driving circuit configured to apply a superimposed current, including a driving current and a position detecting current, to the coil; a filter circuit configured to extract a first alternating current (AC) voltage from a voltage between a middle tap of the coil and one end of the coil and to extract a second AC voltage from a voltage between the middle tap of the coil and the other end of the coil; a voltage/frequency conversion circuit configured to convert the first AC voltage extracted by the filter circuit into a first frequency signal and to convert the second AC voltage extracted by the filter circuit into a second frequency signal; and a digital control circuit configured to detect positional information of the VCM based on a first frequency component of the first frequency signal and a second frequency component of the second frequency signal.

The position detecting current may include a specific frequency component, and the specific frequency component may be used to measure a change in impedance of the coil.

The position detecting current may have one of a sinusoidal wave, a triangle wave, a sawtooth wave, and a square wave waveform.

The coil may include a first coil between the middle tap and the one end of the coil, and a second coil between the middle tap and the other end of the coil. The first coil may be configured to provide the first AC voltage based on a change in impedance caused by a change in a position of the magnetic member. The second coil may be configured to provide the second AC voltage based on impedance that is not changed, even in the case that the position of the magnetic member is changed.

The digital control circuit may be configured to perform a subtraction operation or a division operation on the first frequency signal and the second frequency signal to remove a change in a signal according to noise and a change in temperature.

The coil may include a first coil between the middle tap and the one end of the coil, and a second coil between the middle tap and the other end of the coil. The second coil may have impedance that is blocked from being affected by a change in a position of the magnetic member by a shielding member provided between the second coil and the magnetic member.

The voltage/frequency conversion circuit may include a voltage controlled oscillator configured to generate the first frequency signal based on a magnitude of the first AC voltage and to generate the second frequency signal based on a magnitude the second AC voltage.

The digital control circuit may be configured to perform predetermined signal processing using the first frequency signal and the second frequency signal to remove noise included in the first frequency signal and the second frequency signal before detecting the positional information.

The digital control circuit may be configured to perform one or both of position controlling of the VCM and position correction controlling of the VCM through the driving circuit, based on the positional information.

A first inductance between the middle tap of the coil and the one end of the coil may be set to be greater than a second inductance between the middle tap of the coil and the other end of the coil.

An apparatus for controlling a voice coil motor (VCM) includes a coil disposed to face a magnetic member; a filter circuit configured to extract an alternating current (AC) voltage from a voltage across the coil and to output the AC voltage; a voltage/frequency conversion circuit configured to generate a frequency signal and to output the frequency signal, the frequency signal having frequency based on a magnitude of the AC voltage output from the filter circuit; and a digital control circuit configured to perform one or both of position controlling and position correction controlling of the VCM based on the frequency signal output from the voltage/frequency conversion circuit.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application.

Although terms such as "first," "second," and "third" may be used herein to describe various signals, members, components, or sections, these signals, members, components, or sections are not to be limited by these terms. Rather, these terms are only used to distinguish one member, component, region, layer, or section from another member, component, region, layer, or section.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

The features of the examples described herein may be combined in various ways as will be apparent after an understanding of the disclosure of this application. Further, although the examples described herein have a variety of configurations, other configurations are possible as will be apparent after an understanding of the disclosure of this application.

As described herein, an apparatus for controlling a position of a VCM may use voltage/frequency conversion techniques capable of improving noise excluding characteristics in a system using a driving coil as a detecting coil, without using a separate sensing unit, such as a hall sensor or a sensing coil.

Figure 1:
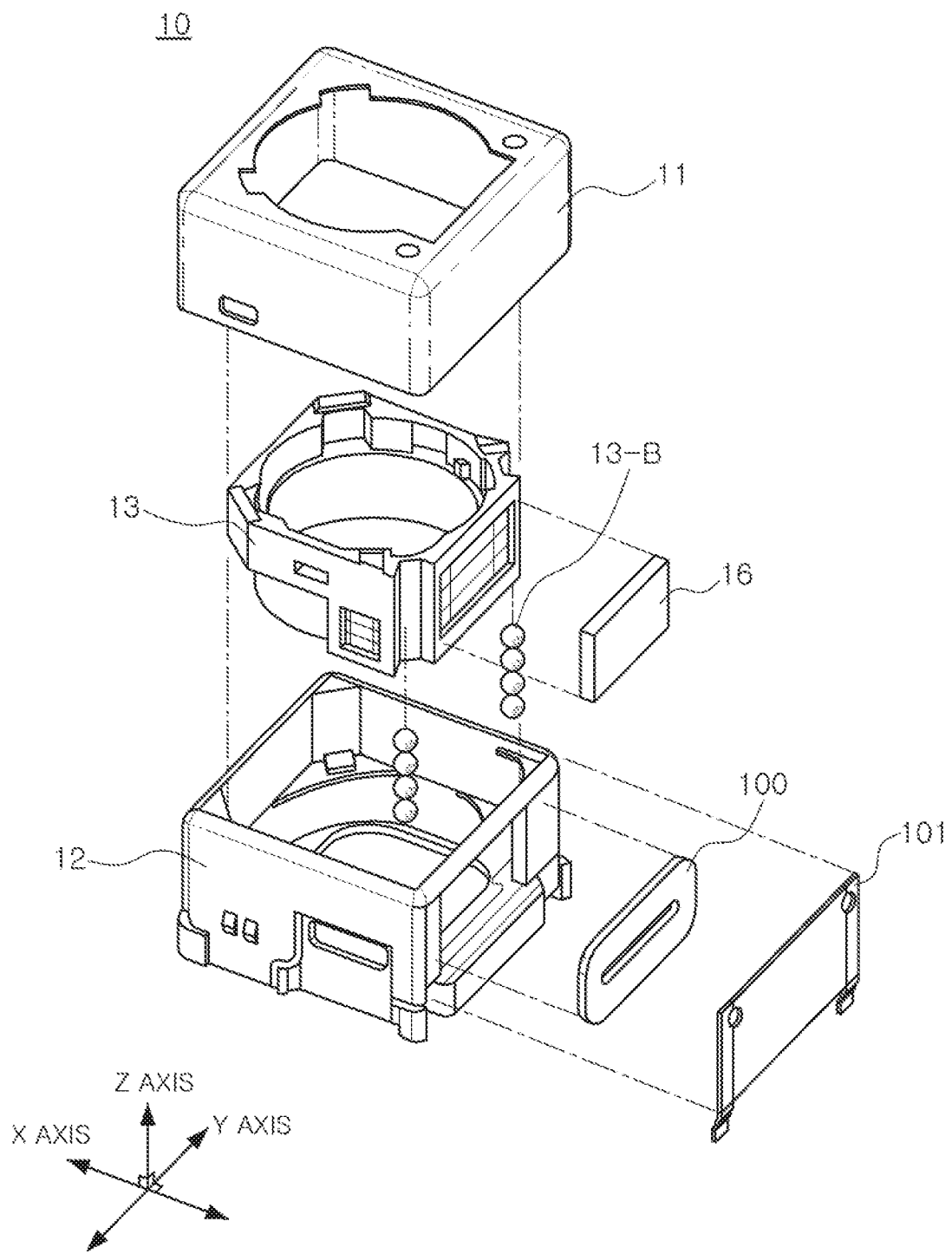
FIG. 1 is an exploded perspective view of an example of a camera module.

FIG. 1 is an exploded perspective view of an example of a camera module.

Referring to FIG. 1, a camera module 10 may include a case 11, a housing 12, a lens carrier 13, a substrate 101, a coil 100, and a magnetic member 16. In addition, the camera module 10 may include ball bearings 13-B.

Figure 2:
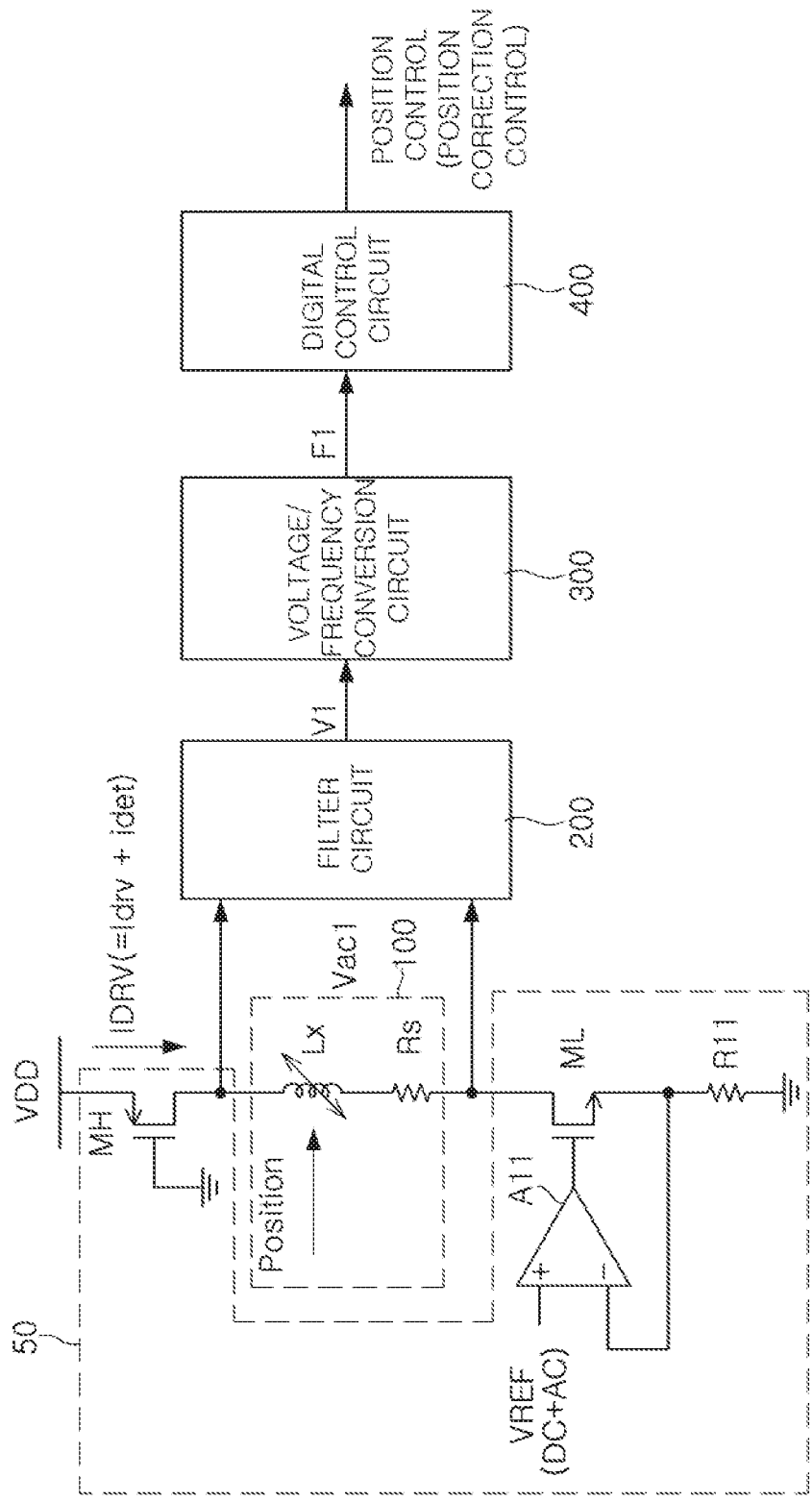
FIG. 2 is a schematic view of an example of one block of an apparatus for controlling a position of a VCM.
Figure 3:
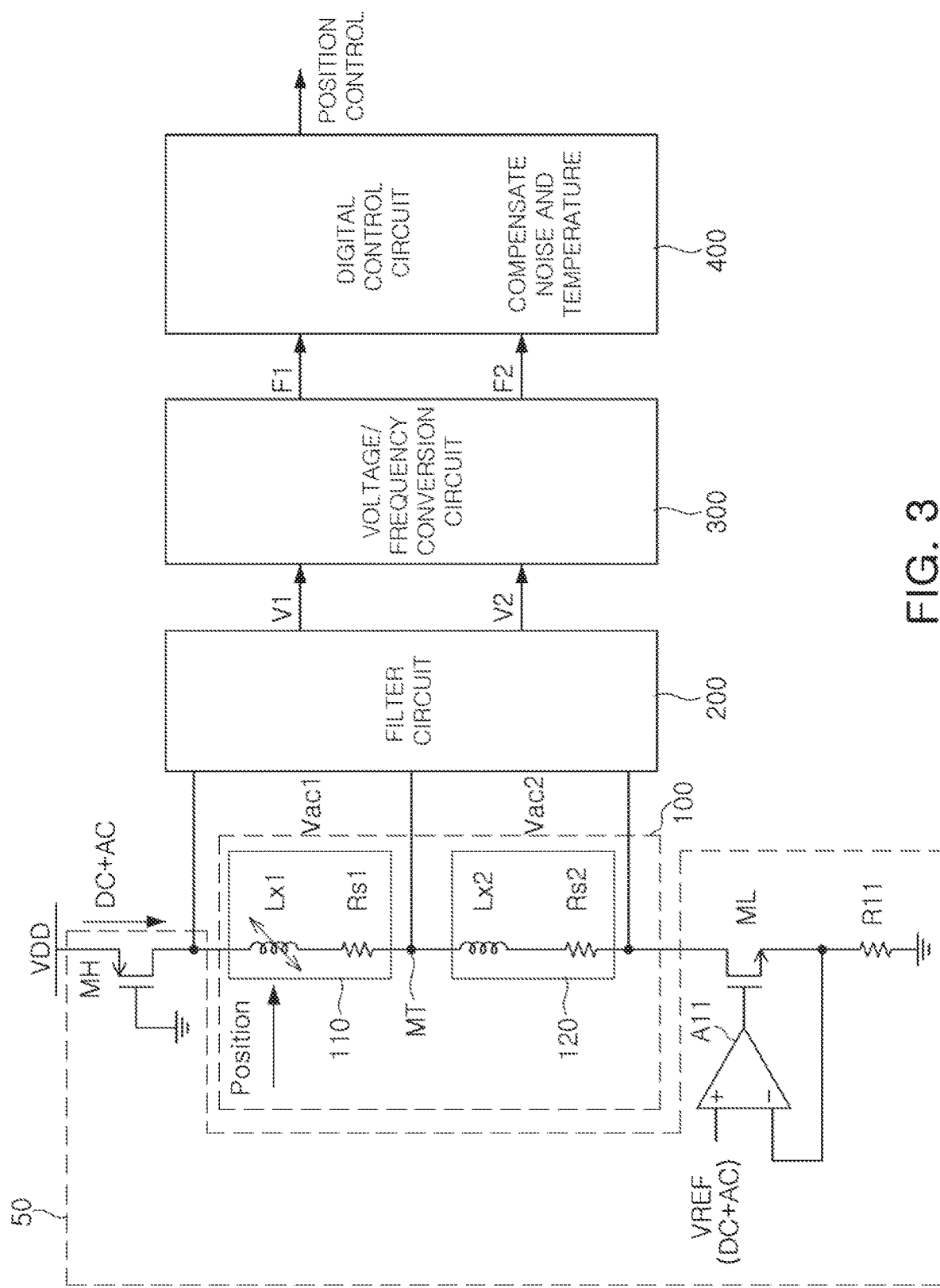
FIG. 3 is a schematic view of an example of another block of the apparatus for controlling a position of a VCM.

In addition, the camera module may include a driving circuit 50, a filter circuit 200, a voltage/frequency conversion circuit 300, and a digital control circuit 400, as illustrated in FIGS. 2 and 3.

A ball bearing type camera module using the ball bearings is illustrated in FIG. 1. However, the present disclosure is not limited thereto, and a spring type camera module may also be used.

The lens carrier 13 may be a shape having a hollow so that at least one lens imaging device may be accommodated therein, and the lens may be disposed in an optical axis direction in the lens carrier 13. Here, the optical axis direction refers to a Z-axis direction in relation to the lens carrier 13 illustrated in FIG. 1.

The lens carrier 13 may be disposed in the housing 12 and be coupled to the housing 12 to move in the optical axis direction for the purpose of autofocusing and move in directions (for example, an X-axis direction and a Y-axis direction of FIG. 1) perpendicular to the optical axis direction for the purpose of optical image stabilization (OIS). As an example, the lens carrier 13 may be a lens module including a lens barrel in which the lens is embedded.

The housing 12 may have an internal space, and may accommodate the lens carrier 13 in the internal space thereof so that the lens carrier 13 may move in the optical axis direction or the directions perpendicular to the optical axis direction.

At least one ball bearing 13-B may be provided in the lens carrier 13 in the optical axis direction, as a guide guiding a movement of the lens carrier 13 when the lens carrier 13 moves in the optical axis direction within the housing 12.

At least one ball bearing 13-B may be disposed between the lens carrier 13 and the housing 12 so that one surface of the lens carrier 13 and one surface of the housing 12 are in contact with each other, and may guide the movement of the lens carrier 13 in the optical axis direction while supporting the lens carrier 13 by a rolling motion.

The case 11 may be coupled to the housing 12 to form an exterior of the camera module 10. The case 11 may be coupled to the housing 12 to surround portions of outer surfaces of the housing 12. The case 11 may include a metal or may be formed of a metal to thus be grounded to a ground pad of the substrate 101 mounted on one surface of the housing 12, resulting in blocking of electromagnetic waves generated during driving of the camera module.

The magnetic member 16 may be disposed on one surface of the lens carrier 13, and the coil 100 may be disposed on one surface of the substrate 101 mounted on one surface of the housing 12 to face the magnetic member 16. As an example, the magnetic member 16 may be a magnet including a magnetic material having a magnet property, or be a conductor or a dielectric.

As an example, the apparatus for controlling a position of a VCM may further include a yoke (not shown) mounted on the other surface of the substrate 101 to improve a detection performance of the coil, thereby preventing a leakage of magnetic flux generated between the magnetic member 16 and the coil 100.

In the respective drawings, unnecessarily overlapped descriptions of for components denoted by the same reference numerals and having the same functions will be omitted, and contents different from each other will be described in the respective drawings.

FIG. 2 is a schematic view of an example of one block of an apparatus for controlling a position of a VCM.

Referring to FIG. 2, the apparatus for controlling a position of a VCM may include a coil 100, a driving circuit 50, a filter circuit 200, a voltage/frequency conversion circuit 300, and a digital control circuit 400.

The coil 100 may be disposed to face the magnetic member 16 provided on one surface of the lens carrier 13, as described above.

The driving circuit 50 may apply a superimposed current IDRV, including a driving current Idrv and a position detecting current idet, to the coil 100 based on a control voltage VREF. Accordingly, the superimposed current IDRV, including the driving current Idrv and the position detecting current idet, may flow through the coil 100, and the coil 100 may transmit a driving force by an electromagnetic force to the magnetic member 16 by the current Idrv. Accordingly, the magnetic member 16 may be driven in the optical axis direction or the directions perpendicular to the optical axis direction by the driving force of the coil 100.

For example, a direct current (DC) voltage by the driving current Idrv and a first alternating current (AC) voltage Vac1 by the position detecting current idet may be generated across the coil 100. Accordingly, the filter circuit 200 may provide a first AC voltage V1 corresponding to the first AC voltage Vac1.

The filter circuit 200 may extract the first AC voltage V1 from a voltage across the coil 100.

The voltage/frequency conversion circuit 300 may generate a first frequency signal F1 having a frequency based on a magnitude of the first AC voltage V1 extracted by the filter circuit 200.

In addition, the digital control circuit 400 may detect positional information based on a frequency component of the first frequency signal F1.

As described above, there is an advantage that an analog-to-digital converter (ADC) is unnecessary by the voltage/frequency conversion circuit 300. In addition, the digital control circuit 400 may remove noise by performing predetermined signal processing, such as averaging or the like, using the first frequency signal F1 from the voltage/frequency conversion circuit 300.

FIG. 3 is a schematic view of another block of the apparatus for controlling a position of a VCM according to an embodiment in the present disclosure.

Referring to FIG. 3, the apparatus for controlling a position of a VCM may include the coil 100, the driving circuit 50, the filter circuit 200, the voltage/frequency conversion circuit 300, and the digital control circuit 400.

The coil 100 may be disposed to face the magnetic member 16 provided on one surface of the lens carrier 13.

The driving circuit 50 may apply the superimposed current IDRV, including the driving current Idrv and the position detecting current idet, to the coil 100, as described in FIG. 2.

Accordingly, a middle tap MT may be connected between one end and the other end of the coil 100, such that a first AC voltage may be generated between one end and the middle tap MT of the coil 100 and a second AC voltage may be generated between the middle tap MT and the other end of the coil 100.

The filter circuit 200 may extract a first AC voltage V1 from a voltage Vac1 between the middle tap MT of the coil 100 and one end of the coil 100, and may extract a second AC voltage V2 from a voltage Vac2 between the middle tap MT of the coil 100 and the other end of the coil 100.

The filter circuit 200 may extract the first AC voltage V1 from the voltage Vac1 between the middle tap MT and one end of the coil 100 among both ends and the middle tap MT of the coil 100 to provide the extracted first AC voltage V1 to the voltage/frequency conversion circuit 300, and may extract the second AC voltage V2 from the voltage Vac2 between the middle tap MT and the other end of the coil 100 to provide the extracted second AC voltage V2 to the voltage/frequency conversion circuit 300.

The voltage/frequency conversion circuit 300 may generate a first frequency signal F1 and a second frequency signal F2 having a frequency based on a magnitude of each of the first AC voltage V1 and the second AC voltage V2, respectively, extracted by the filter circuit 200 to the first and second frequency signals to the digital control circuit 400.

The digital control circuit 400 may detect positional information based on a frequency component of each of the first frequency signal F1 and the second frequency signal F2.

As described above, there is an advantage that an analog-to-digital converter (ADC) is unnecessary by the voltage/frequency conversion circuit 300. In addition, the digital control circuit 400 may remove an effect caused by noise or a temperature change by performing predetermined signal processing, such as subtraction or division, using the first and second frequency signals F1 and F2 from the voltage/frequency conversion circuit 300.

In addition, the superimposed current IDRV, in which the driving current Idrv of DC and the position detecting current idet of AC are superimposed, may flow through the coil 100 by the digital control circuit 400 and the driving circuit 50, as described above, while an actuator of the camera module is driven.

In addition, the digital control circuit 400 may perform position controlling or position correction controlling through the driving circuit 50, based on the positional information.

Meanwhile, one coil 100 illustrated in FIG. 2 may be equivalently modeled to an inductance component Lx and a resistance component Rs.

In addition, the first coil 110 from the middle tap MT to one side of one coil 100 illustrated in FIG. 3 may be equivalently modeled to a first inductance component Lx1 and a first resistance component Rs1. The second coil 120 from the middle tap to the other side of the coil 100 may be modeled to a second inductance component Lx2 and a second resistance component Rs2.

Here, the middle tap MT may be an arbitrary point between both ends of the coil 100. As an example, the coil 100 may include the first coil 110 between the middle tap MT and one end of the coil 100, and the second coil 120 between the middle tap MT and the other end of the coil 100.

The second coil 120 may include impedance, blocked by the shielding member from being affected by a change in the position of the magnetic member 16 between the second coil 120 and the magnetic member 16.

As an example, the first inductance Lx1 between the middle tap MT of the coil 100 and one end of the coil 100 may be set to be greater than the second inductance Lx2 between the middle tap MT of the coil 100 and the other end of the coil 100.

As an example, the first coil 110 may provide the first AV voltage V1 based on a change in impedance by the change in the position of the magnetic member 16, and the second coil 120 may provide the second AV voltage V2 based on impedance that is not changed, even in a case in which the position of the magnetic member 16 is changed.

As an example, the driving current Idrv of DC for driving the lens carrier 13 to which the magnetic member is attached and the position detecting current idet of AC for detecting the position of the lens carrier 13 may flow through the coil 100. Accordingly, a superimposed voltage, in which a DC voltage caused by the driving current Idrv of DC and an AC voltage caused by the position detecting current idet of AC are superimposed, may appear across the coil 100.

Meanwhile, referring to FIGS. 1 through 3, the driving circuit 50 may include bridge circuits MH and ML and bridge driving circuits A11 and R11.

As an example, the bridge circuits MH and ML may include a high-side transistor connected to one end of the coil 100 and a low-side transistor connected to the other end of the coil 100. Here, the bridge circuits, circuits capable of supplying a driving current to the coil, may be half-bridge circuits or full-bridge circuits. In the various embodiments, the bridge circuits are not limited thereto.

The bridge driving circuits A11 and R11 may supply the superimposed current IDRV, in which the driving current Idrv of DC and the position detecting current idet of AC are superimposed, on the coil 100 in response to the control voltage VREF.

For example, the bridge driving circuits A11 and R11 may include an operational amplifier and a resistor, respectively, controlling the low-side transistor of the bridge circuit ML so that the superimposed current flows through the low-side transistor.

As an example, the operational amplifier of the bridge driving circuit A11 may be supplied with the control voltage VREF, on which a control voltage of DC and a position detecting voltage of AC are superimposed, and control the low-side transistor of the bridge circuit ML based on the control voltage VREF, such that the superimposed current (IDRV=Idrv(DC)+idet(AC)) flows through the resistor of the bridge driving circuit R11 and the low-side transistor of the bridge circuit ML.

As an example, the position detecting current idet may include a specific frequency component Fmod, and the specific frequency component Fmod may be a frequency component that does not influence the driving of the lens carrier 13 and may measure a change in impedance of the coil 100, and may be, for example, a frequency higher than an audible frequency (e.g., 100 kHz).

As an example, the position detecting current idet may have one of a sinusoidal wave, a triangle wave, a sawtooth wave, and a square wave waveform.

In the respective embodiments in the present disclosure, the position detecting current of AC is not limited to the illustrated signal, but may be any AC signal including a specific frequency component.

For example, the superimposed current IDRV may be expressed by the following equation 1.

$$IDRV = Idrv + idet = Idrv + k*\sin(2*\pi*Fmod*t) \quad \text{Equation 1}$$

In Equation 1, Idrv is a current of a direct current corresponding to the driving current, and idet is a position detecting current of AC and may be defined as $k*\sin(2*\pi*Fmod*t)$. In addition, k is amplitude of the position detecting current of AC.

For example, when the driving current Idrv of DC flows through the coil 100 by the operational amplifier of the bridge driving circuit A11, an electromagnetic force may occur while the driving current Idrv of DC flows through the coil 100, and a driving force may be provided to the magnetic member 16 by the electromagnetic force. That is, the driving circuit 50 may apply the driving current Idrv to the coil 100 to provide the driving force to the magnetic member 16. As an example, when the driving circuit 50 applies the driving current Idrv of DC to the coil 100, a magnetic field may be generated in the coil 100, and the magnetic field generated in the coil 100 may interact with a magnetic field of the magnetic member 16 to generate the driving force that moves the lens carrier 13 in the optical axis direction (or the directions perpendicular to the optical axis direction) depending on Fleming's left hand rule.

Accordingly, the lens carrier 13 may move in the optical axis direction or the directions perpendicular to the optical axis direction by the driving force. As an example, the driving circuit 50 may include a driver integrated circuit (IC) that provides the driving current Idrv of DC to the magnetic member 16.

In addition, the position detecting current idet of AC of the superimposed current IDRV may be generated by the operational amplifier of the bridge driving circuit A11 to detect the position of the lens carrier 13, and as described above, the position detecting current idet of AC may be the current having the specific frequency component.

Meanwhile, in a state in which a predetermined gap or more is maintained between the magnetic member 16 (FIG. 1) and the coil 100, an overlapped area between the magnetic member 16 and the coil 100 may be changed depending on the change in the position of the magnetic member 16, and an inductance value of the coil 100 may be changed depending on the change in the overlapped area.

In this case, a current position of the lens carrier 13 (or the lens) may be tracked by sensing magnitude (|ZL|) of changed impedance of the coil 100. In order to use the coil 100 for both driving and sensing, a modulation technique of mixing the position detecting current idet of AC with the driving current Idrv of DC may be used.

In this case, the magnitude (|ZL|) of the impedance may be expressed by the following Equation 2.

$$VL = IDRV * |ZL| \quad \text{Equation 2}$$

In Equation 2, VL is the voltage across the coil 100, IDRV is the superimposed current flowing through the coil 100, and |ZL| is the magnitude of the impedance of the coil 100.

Referring to Equation 2, when the magnitude of the impedance of the coil 100 is changed, it may be seen that the voltage across the coil 100 is changed. Accordingly, when the voltage across the coil 100 is measured, the magnitude of the impedance may be detected.

In addition, the magnitude (|ZL|) of the impedance of the coil 100 may be expressed by the following Equation 3.

$$|ZL| = \sqrt{Rs^2 + (2*\pi*F\text{mod}*Lx)^2} \qquad \text{Equation 3}$$

In Equation 3, Rs may be a resistance component of the coil 100, Lx may be an inductance component of the coil 100, and Fmod, a specific frequency component, may be an audio frequency or more.

Amplitude k and a frequency Fmod of the position detecting current of AC may be in a range in which they may measure an amount of change in inductance of the coil 100 without having an influence on the driving of the lens carrier 13. As an example, the amplitude k of the position detecting current of AC may be smaller than that of the driving signal so as not to have an influence on the driving of the lens carrier 13, and the frequency Fmod of the position detecting current of AC should not have an influence on the driving of the lens carrier 13. Here, a phrase "not have an influence on the driving" means that the frequency should be a frequency that does not generate a movement or resonance of the lens carrier.

For example, the amplitude k of the position detecting current of AC may be smaller than that of the driving signal, and the frequency Fmod of the position detecting current of AC may be higher than an audible frequency. As an example, in a case in which the amplitude of the driving current is 100 mA, the amplitude k of the position detecting current of AC may be 5 mA, and the frequency Fmod of the position detecting current of AC may be 100 kHz.

In particular, the voltage/frequency conversion technique described above may be adopted so that even in the case that the amount of change of inductance is small, the detection of the position may be performed. This will be described below.

FIGS. 2 and 3 illustrate circuit examples configured to measure a change in magnitude of impedance according to the change in the position of the lens in linear driving of a voice coil motor (VCM) using the voltage/frequency conversion technique.

Referring to FIGS. 2 and 3, a value of the inductance of the coil 100 may be changed according to the change in the position of the lens carrier, and the AC voltage of the superimposed voltage appearing across the coil 100, in a situation in which the superimposed current (IDRV=Idrv (DC)+idet(AC)) flows through the coil 100, may be changed according to the change in the magnitude of the impedance. The AC voltage may be extracted by the filter circuit 200.

For example, the digital control circuit 400 may perform predetermined signal processing using the first frequency signal F1 and the second frequency signal F2 to thereby remove noise included in the first frequency signal F1 and the second frequency signal F2 before calculating the positional information. As an example, the predetermined signal processing performed by the digital control circuit 400 may be a subtraction operation or a division operation for the first frequency signal F1 and the second frequency signal F2, and a change in a signal according to the noise and the change in temperature may be removed by such a signal processing. Accordingly, the digital control circuit 400 may compensate for the change according to the noise and the temperature.

As described above, FIG. 3 illustrates a structure in which one coil 100 acts as two coils 110 and 120 by using the middle tap MT in the one coil 100.

In FIG. 3, signal lines are connected to each other at the middle tap MT in one coil 100, such that first and second AC voltages Vac1 and Vac2 may be physically input to the filter circuit 200 from the one coil 100. In this case, the filter circuit 200 may include a structure configured to extract the first and second AC voltages V1 and V2.

As described above, one coil 100 may be used as the two coils 110 and 120. This may allow the second coil 120 to have no change in impedance according to the change in the position based on the middle tap MT and may perform a signal processing for the two frequency signals F1 and F2 input from the first and second coils 110 and 120 to thereby offset the effect according to the noise and the change in the temperature.

This will be described in detail. As described above, the impedance may be changed according to the change in the position of the lens and a method for sensing the changed impedance may be used. Here, when the temperature is changed, the impedance may also be changed. In this case, it is impossible to know whether the impedance changes due to the change in the temperature or the change in the position. In the case of products applied to mobile phones, it is necessary to compensate for the change in the temperature because an operation must be guaranteed from −20 to 80° C.

For example, in a case in which one physical coil 100 includes the two functional first and second coils 110 and 120 by the middle tap MT, when impedances of the first and second coils 110 and 120 are L1 and L2, respectively, L1 may be impedance of the first coil 110 having a change according the position. L2 may be impedance of the second coil 120 having no change according to the position.

For example, when a subtraction operation (L1-L2) is performed, a changed portion in the impedance for the change in the temperature may be offset, and only the change in the impedance according to the position may be obtained. In addition, since the noise component is commonly applied to the two coils 110 and 120, it may be offset in the same manner.

1) Impedance L1 Having Change According to Position
  : L(basic inductance)+ΔL_t(change in temperature)+ noise+ΔL_p(change in position)
(2) Impedance L2 That Does Not Have Change According to Position
  : L(basic inductance)+ΔL_t(change in temperature)+noise FIG. 4 is a first schematic view of an example of a voltage/frequency conversion circuit and FIG. 5 is a second schematic view of an example of the voltage/frequency conversion circuit.

Figure 4:
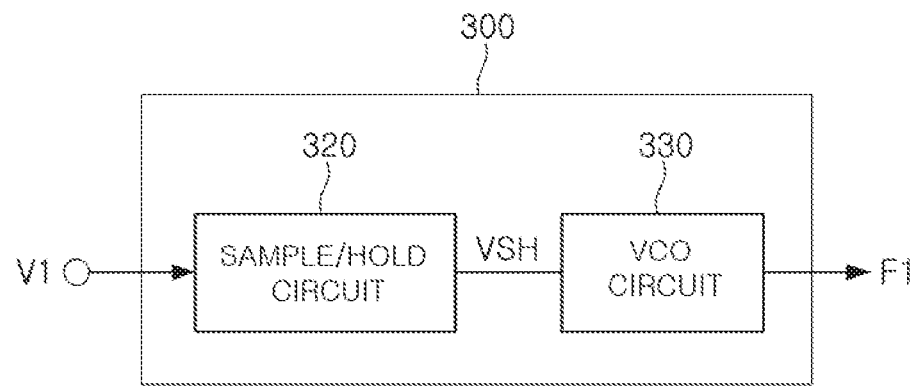
FIG. 4 is a first schematic view of an example of a voltage/frequency conversion circuit.

Referring to FIG. 4, as an example, the voltage/frequency conversion circuit 300 may include a sample/hold circuit 320 and a voltage controlled oscillator (VCO) circuit 330.

Figure 5:
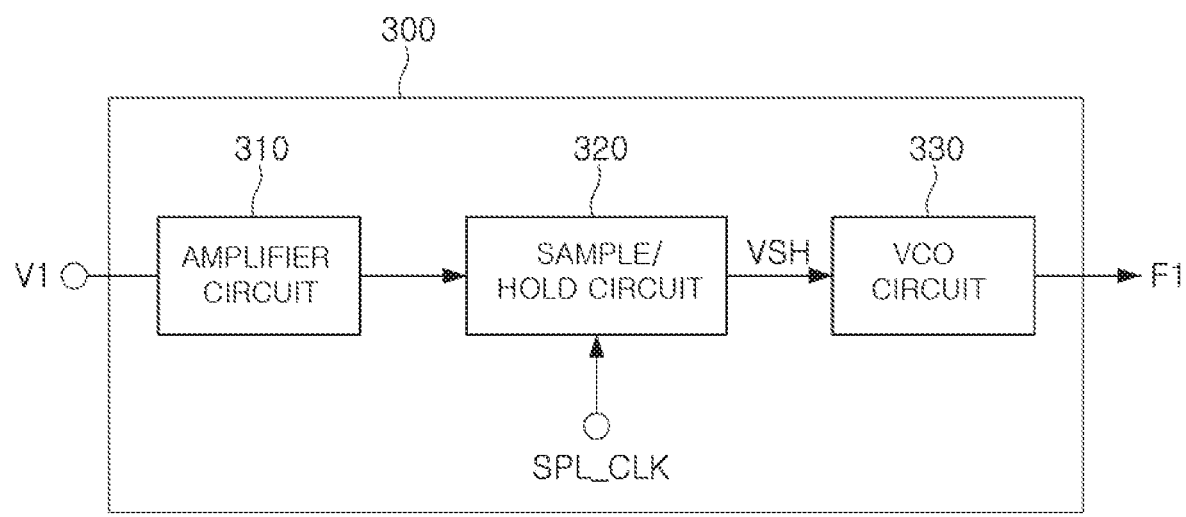
FIG. 5 is a second schematic view of an example of a voltage/frequency conversion circuit.

Referring to FIG. 5, the voltage/frequency conversion circuit 300 may further include an amplifier circuit 310 for amplifying a low signal. For example, the amplifier circuit 310 may be disposed at an input terminal of the sample/hold circuit 320, but is not limited thereto.

Referring to FIGS. 4 and 5, since the AC voltage input to the amplifier circuit 310 of the voltage/frequency conversion circuit 300 is very small, the amplifier circuit 310 may amplify the input AC voltage and provide the amplified AC voltage to the sample/hold circuit 320, and the sample/hold circuit 320 may sample and hold a magnitude of impedance in the AC voltage according to a clock signal and provide the sampled signal V1 to the voltage controlled oscillator (VCO) circuit 330. Thereafter, the VCO circuit 330 may convert the input sampled signal V1 into the frequency signal F1 of a digital form in a clock form.

Accordingly, a value of a frequency may be obtained by the magnitude of the impedance based on the AC voltage extracted from the coil 100. As a result, the magnitude of the voltage corresponding to the magnitude of the impedance may be converted into the frequency signal.

As an example, the VCO circuit 330 may be a circuit configured to provide a signal having an oscillating frequency changed according to the magnitude of the voltage.

Accordingly, since the analog-to-digital converter (ADC) may not be used by using the voltage/frequency conversion circuit, problems caused by using a high cost and large sized high performance ADC may be solved. In detail, when the circuit is implemented with the ADC, since high resolution (several μV) is required, a high performance ADC may be required. It is difficult to implement the high performance ADC at mass production level. Even in a case in which the high performance ADC is implemented, a large area in the integrated circuit is used, which may be economically disadvantageous. In a case in which the ADC is replaced with the voltage/frequency conversion circuit and a digital processing is then performed through a digital control circuit, a relatively small size and area may be implemented while having more improved productivity through a simpler circuit configuration, which may be more economical.

Next, the digital control circuit 400 may detect positional information based on frequency components in the frequency signals F1 or F1 and F2, which are digital signals from the voltage/frequency conversion circuit 300.

Figure 6:
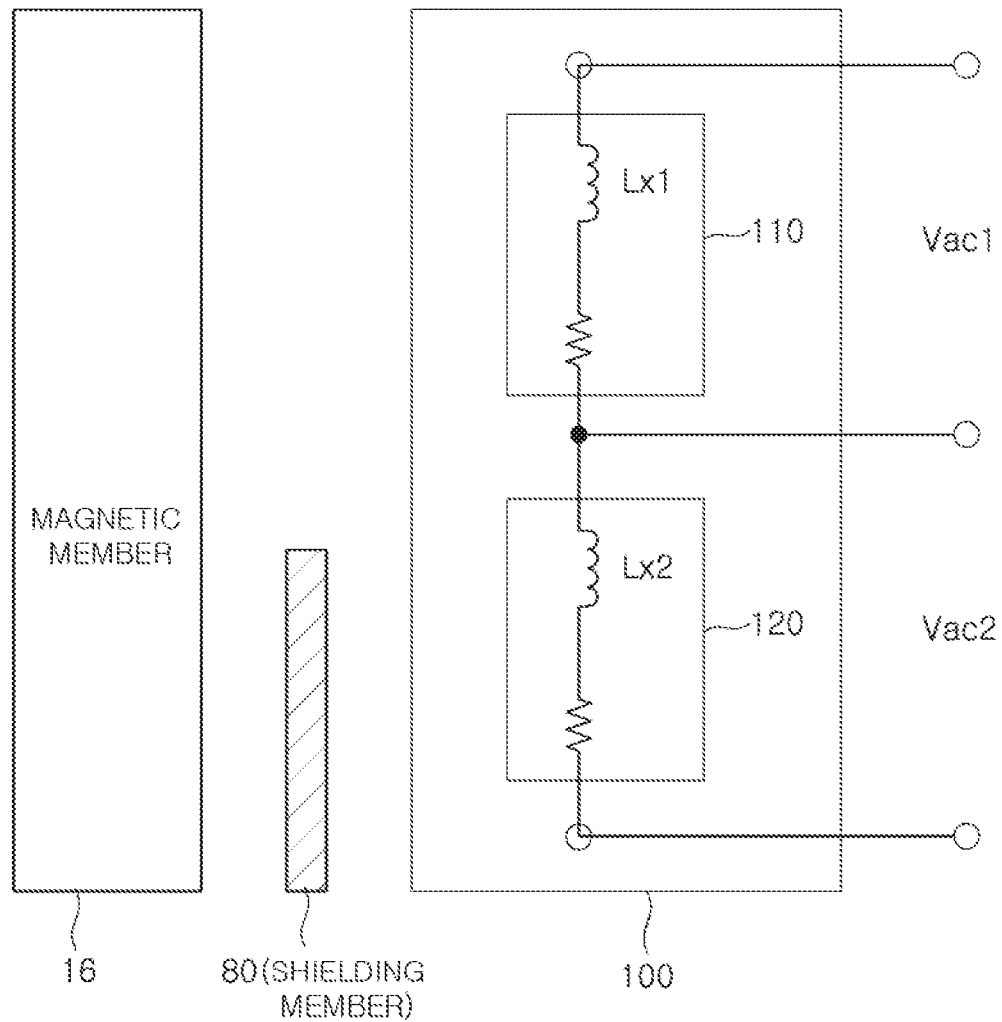
FIG. 6 is a schematic view of an example of a shielding member.

FIG. 6 is a schematic view of an example of a shielding member 80.

Referring to FIG. 6, in order to prevent impedance of the second coil 120 of the coil 100 from changing due to the change in position between the magnetic member 16 and the coil 100, the second coil 120 may include the impedance that may be blocked from being affected by the change in the position of the magnetic member 16 by the shielding member 80 between the second coil 120 and the magnetic member 16.

As an example, in a case in which the coil 100 is manufactured in a multilayer coil, a material that does not react with the magnetic member 16 may be disposed on a first layer of the shielding member 80 for preventing the impedance of the second coil 120 from changing due to the change in position between the magnetic member 16 and the coil 100. As an example, the second coil 120 may be disposed so as not to be directly overlapped with the magnetic member 16. In addition, the shielding member 80 may be implemented in other manners and is not limited to the above-mentioned manner.

Figure 7:
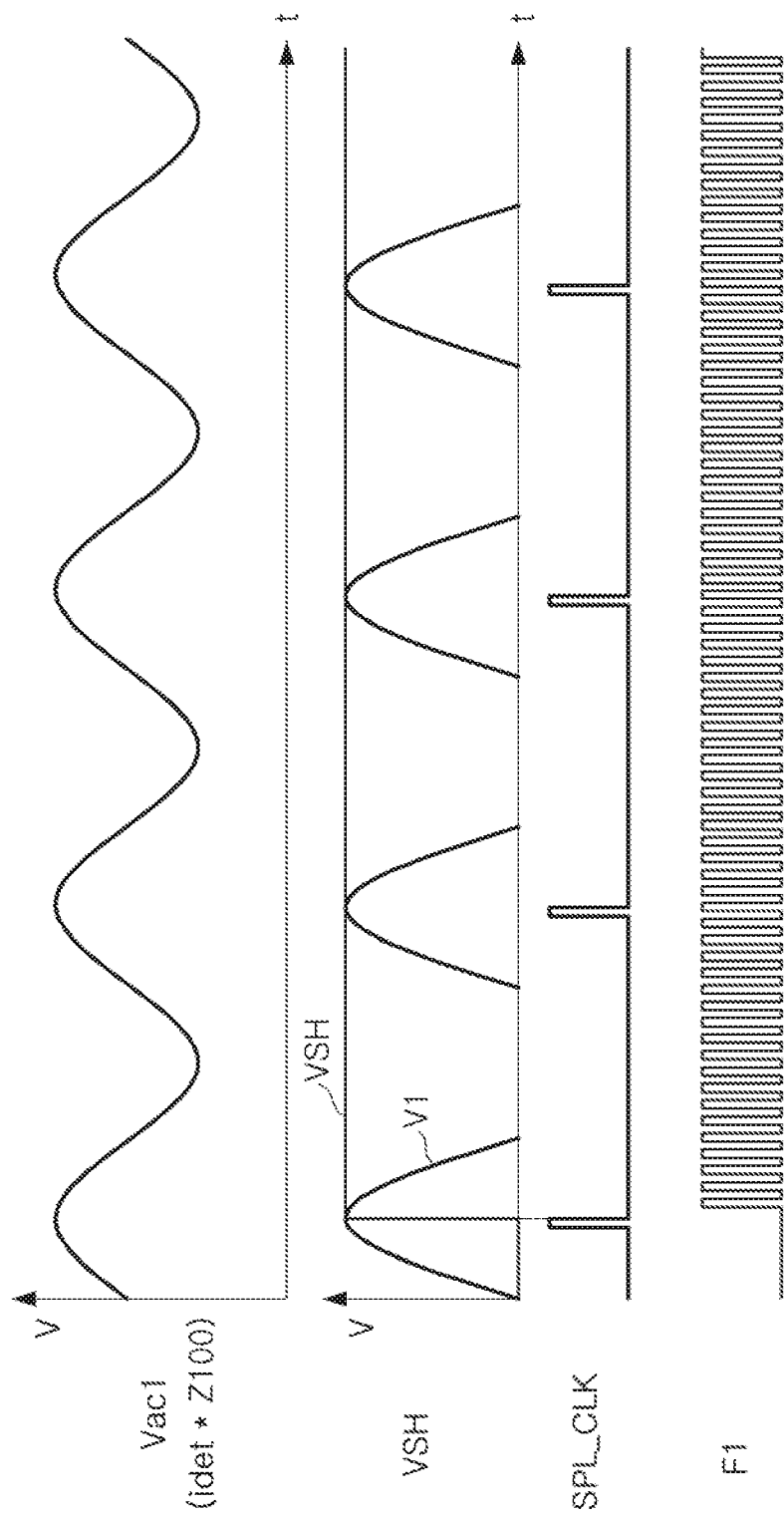
FIG. 7 is a waveform view of main voltages and frequency signals.

FIG. 7 is a waveform view of main voltages and frequency signals.

In FIG. 7, Vac1 may be the AC voltage generated by the position detecting AC current idet of the superimposed voltage appearing across the coil 100, VSH may be a sample signal output from the sample/hold circuit 320 of the voltage/frequency conversion circuit 300, SPL_CLK may be a sample clock used in the sample/hold circuit 320, and F1 may be a first frequency signal output from the VCO circuit 330 of the voltage/frequency conversion circuit 300.

As set forth above, since the apparatus for controlling the position of the VCM does not include a sensing unit, such as a hall sensor, the power consumption may be reduced, the manufacturing cost may be reduced, and the apparatus may be miniaturized to thereby secure competitiveness of the auto focus module or the OIS module.

In addition, since the defective factors that may occur during the manufacturing process and the processes are simplified, an additional effect in addition to a direct effect may be achieved, and since the apparatus for controlling the position of the VCM is a structure that does not include the sensor, the apparatus for controlling the position of the VCM may be applied to an optical image stabilization (OIS) actuator as well as an AF actuator.

As well, since the analog-to-digital converter (ADC) may not be used by using a voltage/frequency conversion function, problems caused by using a high cost and large sized high performance ADC may be solved.

That is, noise excluding characteristics may be improved, and a more precise detection and control for a position of the lens may be performed by adding a function of correcting a temperature change.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for controlling a position of a voice coil motor (VCM), the apparatus comprising:
   a coil disposed to face a magnetic member that is provided on one surface of a lens carrier;
   a driving circuit configured to apply a superimposed current, including a driving current and a position detecting current, to the coil;
   a filter circuit configured to extract an alternating current (AC) voltage from a voltage across the coil;
   a voltage/frequency conversion circuit configured to convert the AC voltage extracted by the filter circuit into a frequency signal; and
   a digital control circuit configured to detect positional information of the VCM based on a frequency component of the frequency signal.

2. The apparatus of claim 1, wherein the position detecting current includes a specific frequency component, and the specific frequency component is used to measure a change in impedance of the coil.

3. The apparatus of claim 1, wherein the position detecting current has one of a sinusoidal wave, a triangle wave, a sawtooth wave, and a square wave waveform.

4. The apparatus of claim 1, wherein the voltage/frequency conversion circuit includes a voltage controlled oscillator that is configured to generate the frequency signal, the frequency signal having a frequency based on a magnitude of the AC voltage extracted by the filter circuit.

5. The apparatus of claim 1, wherein the digital control circuit is configured to perform one or both of position controlling of the VCM and position correction controlling of the VCM through the driving circuit, based on the positional information.

6. An apparatus for controlling a position of a voice coil motor (VCM), the apparatus comprising:
  a coil disposed to face a magnetic member provided on one surface of a lens carrier;
  a driving circuit configured to apply a superimposed current, including a driving current and a position detecting current, to the coil;
  a filter circuit configured to extract a first alternating current (AC) voltage from a voltage between a middle tap of the coil and one end of the coil and to extract a second AC voltage from a voltage between the middle tap of the coil and the other end of the coil;
  a voltage/frequency conversion circuit configured to convert the first AC voltage extracted by the filter circuit into a first frequency signal and to convert the second AC voltage extracted by the filter circuit into a second frequency signal; and
  a digital control circuit configured to detect positional information of the VCM based on a first frequency component of the first frequency signal and a second frequency component of the second frequency signal.

7. The apparatus of claim 6, wherein the position detecting current includes a specific frequency component, and
  the specific frequency component is used to measure an amount of change in impedance of the coil.

8. The apparatus of claim 6, wherein the position detecting current has one of a sinusoidal wave, a triangle wave, a sawtooth wave, and a square wave waveform.

9. The apparatus of claim 6, wherein the coil comprises a first coil between the middle tap and the one end of the coil, and a second coil between the middle tap and the other end of the coil,
  the first coil is configured to provide the first AC voltage based on a change in impedance caused by a change in a position of the magnetic member, and
  the second coil is configured to provide the second AC voltage based on impedance that is not changed, even in the case that the position of the magnetic member is changed.

10. The apparatus of claim 9, wherein the digital control circuit is configured to perform a subtraction operation or a division operation on the first frequency signal and the second frequency signal to remove a change in a signal according to noise and a change in temperature.

11. The apparatus of claim 6, wherein the coil includes a first coil between the middle tap and the one end of the coil, and a second coil between the middle tap and the other end of the coil, and
  the second coil has impedance that is blocked from being affected by a change in a position of the magnetic member by a shielding member provided between the second coil and the magnetic member.

12. The apparatus of claim 6, wherein the voltage/frequency conversion circuit includes a voltage controlled oscillator configured to generate the first frequency signal based on a magnitude of the first AC voltage and to generate the second frequency signal based on a magnitude the second AC voltage.

13. The apparatus of claim 6, wherein the digital control circuit is configured to perform predetermined signal processing using the first frequency signal and the second frequency signal to remove noise included in the first frequency signal and the second frequency signal before detecting the positional information.

14. The apparatus of claim 6, wherein the digital control circuit is configured to perform one or both of position controlling of the VCM and position correction controlling of the VCM through the driving circuit, based on the positional information.

15. The apparatus of claim 6, wherein a first inductance between the middle tap of the coil and the one end of the coil is set to be greater than a second inductance between the middle tap of the coil and the other end of the coil.

16. An apparatus for controlling a voice coil motor (VCM), the apparatus comprising:
  a coil disposed to face a magnetic member;
  a filter circuit configured to extract an alternating current (AC) voltage from a voltage across the coil and to output the AC voltage;
  a voltage/frequency conversion circuit configured to generate a frequency signal and to output the frequency signal, the frequency signal having frequency based on a magnitude of the AC voltage output from the filter circuit; and
  a digital control circuit configured to perform one or both of position controlling and position correction controlling of the VCM based on the frequency signal output from the voltage/frequency conversion circuit.

* * * * *